2,698,824

SKIN PROTECTIVE SUBSTANCE

Sergius Morgulis, Omaha, Nebr.

No Drawing. Application August 4, 1953,
Serial No. 372,401

4 Claims. (Cl. 167—90)

This invention relates to a new type of skin protective substance and more particularly to a skin protective substance which can be applied from a cream or ointment base and which will form an impervious, durable film on the skin.

Contact dermatoses make up about 60% of all occupational diseases reported in the United States, and the cost to industry is estimated at about one-hundred million ($100,000,000) a year. Unpleasant skin irritations are not confined to industry, however, since many people are subject to irritation from such substances as soaps, chemicals, oils, dyes and a wide variety of other items. A large number of attempts has been made in the past to provide some sort of relief for sufferers from contact dermatoses by the application of a substance to the skin. To date none of these has proven satisfactory, as evidenced by the large number of new items which appear on the market every year in answer to this need. An ideal protective substance should be nonirritating, easy to apply, not easily removed under working conditions, and should give actual protection as shown by laboratory and clinical tests. It should be invisible, incapable of staining, greaseless, and should not interfere with the sense of touch. Prior to this invention no such ideal protective substance has been found.

One of the principal objects of this invention is to provide a skin protective substance which will effectively isolate materials which have irritating effects from the skin. A second object of the invention is to provide a skin protective substance which will fulfill all of the requirements of an ideal skin protective substance as set forth in the preceding paragraph. A further object of the invention is to provide a skin protective substance which will form an impervious, non-tacky film on the surface of the skin, and which will not readily be removed by washing and abrasion.

These and other objects and advantages of the invention will become more apparent upon a consideration of the following description of the invention.

According to the invention there is now provided a skin protective substance which can be applied in the form of a cream or ointment and which will deposit a thin, water-resistant film on the skin. The film is substantially impervious to irritating, corrosive or allergenic substances that may affect the skin. The film is substantially water insoluble and will remain on the skin through several normal washings. It likewise is a durable film which will be retained on the skin through normal abrasion.

The skin protective substance is composed of a plastic residue which contains a portion of a nitro-cellulose, an innocuous, nitrocellulose-compatible oil, and an organic silicone material. The residue is a plastic type material which has the property of forming a thin impervious film on the skin. The residue itself is a crumbly, non-tacky plastic residue which is ordinarily applied to the skin by incorporating it into a conventional cream or ointment vehicle base. A preferred base is an oil-in-water emulsion type cream such as a vanishing cream type of base, but the residue may also be applied to the skin by dispersing it in an ointment base.

The protective skin substance incorporated into a cream base is applied to the skin with rubbing until it is no longer visible. When the cream base has become dissipated the plasticized residue will form a greaseless, non-tacky, inert coating which can neither be seen nor felt and which is not easily removable with soap and water.

While the material is primarily useful as a prophylactic measure in the prevention of contact dermatoses, of the type arising from contact with chemicals, soaps, dyes, cosmetics, fabrics, pollens and the like, it also provides substantial protection against burns, either chemical or heat.

Another important use for the skin protective substance is in preventing irritation and excoriation of adjacent skin by the fluids which escape from body openings after surgery. The material is also quite helpful in preventing the so called housewives dermatosis which arises from continual contact of the hands with soapy water. Other possible indications in which the material has been found useful are in the prevention of diaper rash in infants and in the alleviation of pruritus conditions. The material is purely a prophylactic substance and should only be employed in the prevention of a skin condition, and not in an attempt to correct an already existing skin irritation. The material is substantially non-toxic and may be applied at frequent intervals to the skin over a long period of time without any adverse effects to the normal individual.

One protective substance according to the present invention comprises generally a plastic residue which is made up of a combination of an organic silicone compound, an innocuous, nitrocellulose-compatible oil, and a nitrocellulose material. The organic silicone compound includes those compounds of silicone which contain carbon of such a character as definitely to impart organic properties to the molecule. The residue is intimately admixed in a carrier or diluent of the so called cosmetic type which includes vanishing creams, lotions, ointments, and others commonly known in the pharmaceutical and cosmetic industry.

In the preceding paragraph the term "silicone" is used in its ordinary sense as it is defined in text books. For example, in the text "Chemistry of the Silicones" by Eugene G. Rochow (Wiley & Sons 1946) on page 122 a silicone is defined as a "polymeric organosiloxane composed of multiples of the structure

where R is a hydrocarbon radical, or derived therefrom by substitution of oxygen for a portion of the organic groups; a polymeric organosilicon oxide." In this same text the term "siloxane" is defined as "A compound of silicon distinguished by an arrangement of alternate silicon and oxygen atoms . . ."

The organic silicones which are used in the practice of the invention are the polymerized dihydrocarbon silicones of the general formula

in which R and R₁ represent hydrocarbon groups, usually but not necessarily alike, which may range from C₁ (methyl) to C₈ (octyl) or may be alicyclic (e. g., cyclohexyl) or aryl (e. g., phenyl) or aralkyl (e. g., benzyl).

It is believed that the materials which are suitable for use in the practice of the present invention may also be accurately defined as organopolysiloxanes of the type shown by the formula

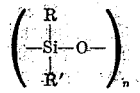

where R and R' are the same or different hydrocarbon radicals, such as methyl, ethyl, propyl, butyl, amyl, phenyl, or benzyl and $n$ indicates polymerization. Stated in another way the materials suitable for the practice of this invention may be accurately defined as organopolysiloxanes which are oils, compounds or greases, as contrasted to those which are resins or varnishes. Fillers of various types, antioxidants, soaps and the like may be incorporated into the organopolysiloxane without seriously altering the residue. Ordinarily, of course, it will be more desirable to use a pure organopolysiloxane.

In addition to castor oil any other innocuous, nitrocellulose-compatible oil may be employed either alone or in combination with other oils of a similar type and in combination with castor oil. When it is said that the oil must be compatible with nitrocellulose it is intended that the oil must be of the type which will not prevent the solution of the nitrocellulose in solvents and the subsequent plasticization of the nitrocellulose with the oil and with the organopolysiloxane. Vegetable oils are preferred substitutes, and particularly sesame oil, cottonseed oil and corn oil.

The nitrocellulose referred to herein is the commercial grade of nitrocellulose which is available in the form of a white fluffy material prepared by the nitration of blown wood chips or cotton linters (Du Pont HA 17E Nitrocellulose). Since the nitrocellulose is ordinarily employed in the form of a solution in suitable solvent it will be obvious that the material may be supplied directly in the solvent form rather than in the form of the white solid.

The plasticized residue to which this invention pertains may be composed of about 10–20 parts of the nitrocellulose material, about 6–16 parts of an organopolysiloxane and about 50–80 parts of oil. The residue is dispersed in a cosmetic type base in a ratio of about one part of residue to about 2–4 parts of the base, depending on the particular type of base and the consistency of the final material which is desired. For instance, in a heavy, thick base more residue is employed than in a thin, lotion type base.

The following examples are presented in order to define the invention more precisely, but it should be understood that the invention is not to be limited in any way by the examples.

*Example I*

A skin protective ointment is prepared in the following manner: about 76 parts by weight of castor oil and about 8 parts of a silicone grease (DC4 Silicone Grease, Dow Corning, which is a polydimethyl siloxane with colloidal silica filler) are thoroughly mixed. About 16 parts by weight of nitrocellulose in a 15% w./v. solution of 1–3 alcohol-ether mixture is added to the oil and silicone mixture (the term w./v. indicates unit weight of nitrocellulose per unit volume in alcohol-ether solution). The mixture is stirred and gradually heated to distill off the solvent mixture. The heating is continued until the last trace of solvent is distilled off. The solid residue which remains is dried to a constant weight at 110° C.

The residue is milled into a vanishing cream base in a ratio of one part of residue to three parts of cream. The vanishing cream base is prepared by emulsifying a mixture of 25 parts of stearic acid, 10 parts spermaceti, and 65 parts of water containing 1.5 parts of 2-amino-2-methyl-1,3-propanediol.

The resulting ointment is a thick, white paste suitable for use on skin such as the hands, face, etc. The ointment is applied by rubbing a small amount on the exposed skin area desired to be protected, and the rubbing continued until the ointment is no longer in evidence on the skin area. The application of the ointment may be repeated daily without harmful effects therefrom.

*Example II*

A silicone residue is prepared by dissolving 12 parts of nitrocellulose in a mixture of 120 parts of ether and 45 parts of alcohol. A mixture of 6 parts of silicone (DC4 Silicone Grease, Dow Corning) and 57 parts of castor oil is added to the nitrocellulose solution with agitation until smoothly dispersed therein. The mixture is then placed on a steam bath until the solvent is evaporated off. The residue is dried to a constant weight at 110° C.

The skin protective cream is prepared by melting 630 parts of diglycol stearate, 45 parts of cetyl alcohol and 45 parts of stearin. To the melt is added 200 parts of ethanol, 225 parts of propylene glycol, and 1500 parts of the silicone residue. The mixture is agitated until a smooth dispersion is obtained. To the oil melt is added 3300 parts of water (75–80° C.) containing 2.2 parts of benzoic acid, and the agitation is continued while the mix is cooling. The mix is passed through a homogenizer and the homogenized mass is continuously agitated until it reaches room temperature. At room temperature the cream is a smooth, thick paste.

*Example III*

An oil type protective cream is prepared by emulsifying a silicone residue composed of 20 parts of nitrocellulose, 10 parts of silicone and 75 parts of castor oil (the residue is prepared according to the directions of Example I) and an oil type base composed of 30 parts of cholesterin, 30 parts of cottonseed oil and 940 parts of white petrolatum. The oil base is made by heating the cottonseed oil and petrolatum to about 145° C. with agitation. The melt is removed from the heat and the cholesterin is added under continuous agitation. The mixture is permitted to cool to room temperature with agitation. The residue is then blended into the mixture to form a smooth dispersion.

*Example IV*

The procedure outlined in Example I is repeated with the substitution of a silicone fluid for the silicone compound of that example. In this example 8 parts of a methylphenylpolysiloxane is employed. This organopolysiloxane is defined by the manufacture as being a moderately aromatic methylphenylpolysiloxane (Dow Corning, 550). 76 parts of castor oil and 16 parts of nitrocellulose are used as in Example I. The solvent for the nitrocellulose is driven off after mixing is completed and the residue is milled into a vanishing cream base. The product is a white cream which has good heat and oxidation stability.

*Example V*

The procedure outlined in Example I is repeated substituting a methylphenylpolysiloxane of relatively high aromaticity. The material is known commercially as Dow Corning 710 and it forms a good heat and oxidation stable skin protective substance when incorporated into a residue with nitrocellulose and castor oil.

*Example VI*

The procedure outlined in Example I is repeated substituting a silicone fluid for the silicone compound employed in Example I. The silicone fluid used in this example is a dimethylpolysiloxane having a viscosity on the order of about 1,000,000 centistokes (Dow Corning 200 fluid, 1,000,000 centistokes), 8 parts of this dimethylpolysiloxane is incorporated into a residue along with 10 parts of nitrocellulose and 76 parts of castor oil. The residue is dried in the customary manner and is milled into a vanishing cream base. The product is a smooth, white cream which readily forms a thin, non-tacky film on the skin.

*Example VII*

The procedure outlined in Example VI is repeated with the exception that the dimethylpolysiloxane employed therein is one having a viscosity of about 30,000 centistokes (DC 200 fluid, 30,000 centistokes), and 80 parts of castor oil is used. These materials form a crumbly, non-tacky residue when combined with nitrocellulose and dried in the customary fashion. The residue is milled into an oil-in-water emulsion type cream base.

*Example VIII*

The procedure in Example VI is repeated substituting about 16 parts a dimethylpolysiloxane having a viscosity of about 100 centistokes at 25° C. (DC 200 fluid, 100 centistokes). The finished residue has properties similar to those obtained in the previous examples and forms a good film-forming protective skin cream.

*Example IX*

The procedure outlined in Example I is repeated substituting diethylpolysiloxane fluid in place of the silicone grease employed in Example I. The diethylpolysiloxane is a clear fluid of medium viscosity which is compatible with nitrocellulose and castor oil and which forms a residue in the customary manner having properties quite similar to those obtained with the other silicone fluids.

Other silicone fluids, greases and compounds may be employed in the formulation in place of those outlined in the preceding examples. The silicone compounds are primarily mixtures of the silicone fluids with bodying agents or fillers such as colloidal silica. The silicone emulsions such as the antifoams are silicone oil-in-water type emulsions and are suitable for use in this invention merely by adjusting the formula to provide an equivalent amount of silicone. The silicone greases are essentially the silicone fluids to which is added a soap, such as a stearate soap. Hence, it will be apparent that the organopolysiloxanes may be employed in any of their numerous forms so long as a type is used which contains a methyl, ethyl, amyl or phenyl group or any combination of these groups.

This application is a continuation-in-part of copending application Serial No. 248,640, filed September 27, 1951, now abandoned.

Others may practice the invention in any of the ways which will be suggested to one skilled in the art. It is considered that all such practice shall be included in the invention provided it fairly falls within the scope of the appended claims.

I claim:

1. A water-resistant, film-forming, skin protective composition comprising a plastic residue consisting essentially of a nitrocellulose, an organopolysiloxane and an innocuous, nitrocellulose-compatible oil, said residue being dispersed in an aqueous oil-in-water emulsion type cream base.

2. A water-resistant, film-forming, skin protective composition comprising one part by weight of a plastic residue consisting essentially of 10–20 parts by weight of nitrocellulose, 6–16 parts by weight of an organopolysiloxane and 50–80 parts by weight of castor oil, said residue being dispersed in 2–4 parts by weight of an aqueous oil-in-water emulsion type cream base per part of residue.

3. A water-resistant, film-forming, skin protective cream comprising one part by weight of a plastic residue consisting essentially of about 16 parts by weight of nitrocellulose, about 8 parts by weight of a film-forming organopolysiloxane and about 76 parts by weight of castor oil, said residue being dispersed in about 3 parts by weight of an aqueous vanishing cream base per part of residue.

4. A water-resistant, film-forming, skin protective composition comprising a plastic residue consisting essentially of a nitrocellulose, an organopolysiloxane and an innocuous, nitrocellulose-compatible oil, said residue being dispersed in an ointment vehicle base.

References Cited in the file of this patent

FOREIGN PATENTS 725,945   Germany _____ Oct. 2, 1945

OTHER REFERENCES

Military Surgeon, May 1950, p. 384.
Foerster: Journal of the American Medical Assn., June 5, 1943, vol. 122, pp. 370 to 375.
U. S. Dispensatory, 24th ed. (1947), p. 323.